Nov. 23, 1948.　　　C. E. BAZLEY ET AL　　　2,454,538
SHOCKPROOF SUPPORT
Filed July 17, 1944

Inventors:
Carl E. Bazley,
Charles Bangert, Jr.,
by Harry E. Dunham
Their Attorney.

Patented Nov. 23, 1948

2,454,538

UNITED STATES PATENT OFFICE 2,454,538

SHOCKPROOF SUPPORT

Carl E. Bazley, Schenectady, and Charles Bangert, Jr., Ballston Spa, N. Y., assignors to General Electric Company, a corporation of New York Application July 17, 1944, Serial No. 545,274

3 Claims. (Cl. 248—20)

Our invention relates to shockproof supports, especially supports for mounting electric apparatus in such manner that high impact shocks applied to the supporting body or framework for the apparatus are not transmitted with damaging effect to the electric apparatus, and has for its object a simple and reliable support of this character.

In carrying out our invention in one form, we provide friction means for absorbing the energy of the shock without damage to the electric apparatus. More specifically, we provide a stiff spring bar supporting member having a central portion rigidly secured to one of two members, constituting supported and supporting members, while its ends are secured to the other of the two members in a predetermined frictional relation therewith. Thus, upon the application of a shock to the supporting one of the two members, i. e., the member which is secured to the supporting structure, the bar takes a transient deflection so that its ends tend to slide frictionally on the other member thereby to dissipate the energy of the shock.

Figure 1:
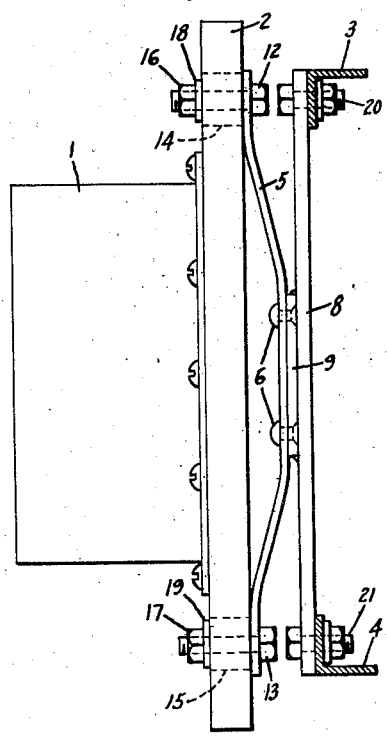
Figure 2:
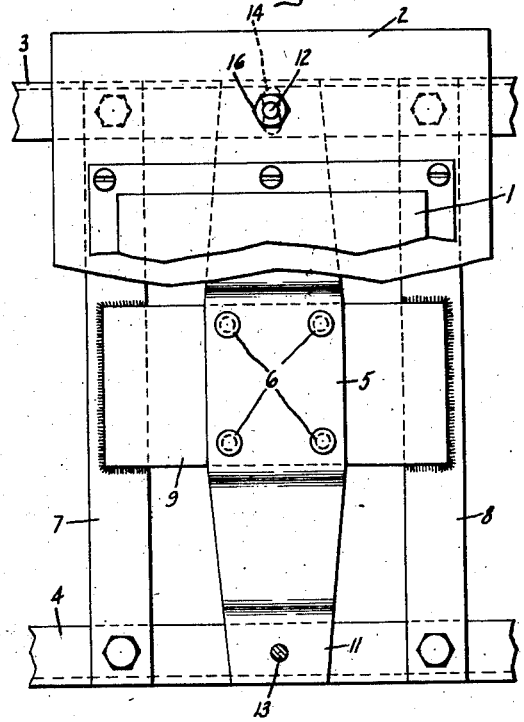
Figure 3:
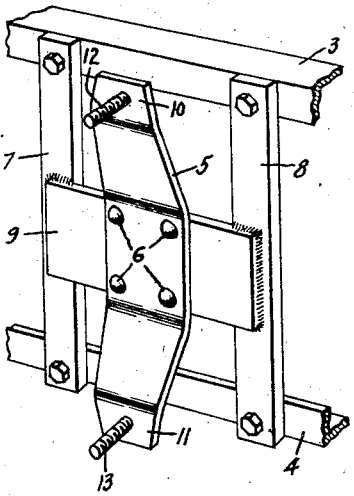

For a more complete understanding of my invention, reference should be had to the accompanying drawing, Fig. 1 of which is a side elevation view of a shockproof support embodying our invention; Fig. 2 is a front elevation view of Fig. 1 but with parts cut away; while Fig. 3 is a view in perspective showing the supporting and shock damping spring strip.

Referring to the drawing, we have shown our invention in one form as applied to the supporting of electric switching and control apparatus 1 mounted on a suitable electrically insulated supported member or panel 2, which panel in turn is supported by a supporting body constituted by the angle bar or beam supports 3 and 4. It will be understood that the angle bars are secured to the supporting structure such as a building, ship, etc.

Our shockproof support in one form comprises a stiff bow-shaped spring bar 5 having a central portion secured to the supporting body 3, 4. This connection is effected by spaced apart, cross bars 7 and 8 having their ends secured respectively to the angle beams 3 and 4, as shown in upright positions. Extending across the bars 7 and 8 is a connecting bar support 9 secured to the bars 7 and 8 suitably as by welding. The central portion of the bar 5 is secured to this cross member 9, constituting a supporting member, by means of the rivets 6.

To provide for suitable flexing of the two cantilever lengths, upper and lower, as seen in the drawing, of the spring bar 5, the lengths are bent, as shown in the drawing, away from the angle bars 3 and 4 so that the bar 5 is substantially bow-shaped. Also, the two end portions 10 and 11 of the bar are bent into parallel relation with the central portion of the strip, i. e., in parallel relation with the bars 7 and 8 and with the adjacent surface of the panel support 2. The two ends 10 and 11 are frictionally secured flatwise to the panel support 2 by means of clamping bolts 12 and 13 extending respectively through the ends of the bar and through elongated holes 14 and 15 in the panel 2, the holes being elongated in a direction lengthwise of the bar 5. By means of the nuts 16 and 17 on the bolts and washers 18 and 19, the end portions 10 and 11 of the spring bar are clamped tightly against the smooth surface of the panel support 2 thereby to produce a predetermined amount of energy dissipating motion damping friction between the ends and the panel in the event of a shock.

In the event of a shock applied to the supporting structure on which the angle irons 3 and 4 are mounted in a direction normal to the panel, i. e., from left to right or vice versa as seen in the drawing, this shock is transmitted by the bars 7 and 8 and the cross bar 9 directly to the central portion of the spring bar 5. Because of their inertia, the electric apparatus 1 and panel 2 tend to remain stationary whereby the central portion of the spring bar and parts to which it is secured are moved by the shock with respect to the panel and the electric apparatus. This movement produces deflection or bendings of the bar 5 with a change in the length of the bar and lengthwise movement of the ends 10 and 11 on the surface of panel 12. By reason of the friction between these ends and the panel, the energy of the shock is dissipated by this movement so that the preponderantly great destructive force of the shock is dissipated as heat energy by friction with the result that this destructive force of the shock is not transmitted to the electric apparatus 1. Thus the electric apparatus is not damaged by high impact shocks applied to the supporting angle irons 3 and 4.

The strength and rigidity of the spring bar 5 will, of course, be dependent upon the weight of the electric apparatus 1 and the panel 2 supported by it. For normal supporting purposes, it will be strong enough to constitute a substantially rigid support, i. e., the weight of the apparatus 1 and the panel 2 does not bend the bar 5. Moreover, the bar 5 must be strong enough so that it will not buckle in the event of a shock but while bending will produce sufficient end thrust to slide its ends over the face of the panel 2 thereby to dissipate the energy of the shock.

It will be understood that a shock produces oscillatory movements or whip of decreasing violence whereby the ends of the bar 5 are moved back and forth over the surface of the panel tube. This action results in the return of the bar 5 to its normal shape against the friction between its ends and the panel even though the static friction between the bar and the panel is much greater than the strength of the spring itself in recovering its normal shape after deformation.

In a typical shockproof support embodying our invention, the spring bar 5 was made from cold rolled steel $\frac{3}{16}$ inch thick, the bar being 15 inches long and 3½ inches wide at its widest portion in the middle. This bar was found to provide a satisfactory shockproof support for electric apparatus 1 and a panel 2 whose combined weight was between 25 and 50 pounds. The bar 5 was stiff and rigid with respect to the weight of the apparatus and the panel, and showed no deflection by reason of their weight. The panel was made from a phenolic condensation product and was provided with a smooth surface for engagement with the smooth ends of the spring bar.

It will be understood that when the bar 5 is made of cold rolled steel, as stated above, or an equivalent material, the bar is not a spring bar in the sense of a conventional hardened steel bar which fully recovers its shape after extensive bending. In fact, the cold rolled steel material has limited spring recovery properties. We have found that in some cases the bar made of cold rolled steel is given a permanent set by a high impact shock and does not recover its original shape after the shock. In that event, a later shock tends to bend the bar in the opposite direction back to its original shape.

In this typical sample described above and shown substantially to scale in the patent drawings, the bolts 12 and 13 were tightened to the same extent as bolts used in securing similar parts rigidly together, as for example, the bolts 20 and 21 securing the bar 8 to the beams 3 and 4. The tightening of the bolts was not found to be critical and its permissible tolerance was great enough to allow for differences in the strength and judgment of the workmen constructing the apparatus. Actually, in the sample device a socket wrench was used having a 10-inch cross lever at its end which the workman engaged with both hands. It was found, after a number of applications for test purposes of a 2,000 foot-pound impact shock to the supporting structure including the beams 3 and 4, that the bolts in the structure subjected to the force of the shock, such as the bolts 20 and 21, were stretched so as to be loose and required tightening. This gives an idea of the tremendous impact force applied. The bolts 12 and 13, however, securing the ends of the spring bar to the panel retained their original tightness and did not require tightening.

As indicated in the drawing, the supporting bars 7, 8 and 9 are constructed of heavier material and are stronger than the spring bar 5, although these parts are given some deflection by the force of the shock and dissipate some energy.

It will be understood that, with a slot in the panel for each of the bolts 12 and 13, the bolts may not return after each shock to their central positions in the slots. This results in a limited up-and-down movement of the panel and apparatus on the bolts. Where the space requirements are limited and this movement of the panel and apparatus cannot be tolerated, we have found that the bar 5 forms a satisfactory shockproof support if one of the holes in the panel is circular so as to secure rigidly that end of the bar to the panel. We prefer, however, to have slots in the panel for both of the bolts. To facilitate assembly of the apparatus the bolts 12 and 13 preferably are secured as by welding to the bar 5 as shown in Fig. 3. Also the slots may be provided in the ends of the bar 5 instead of in the panel 2.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. A shockmount for preventing damage from high impact shock comprising a supporting member subject to vibration under shock, a supported member, an elongated normally rigid connecting bar having a first portion rigidly secured to one of said members, said bar being formed of material incapable of withstanding said high impact shock without exceeding its elastic limit, and clamping means securing a second portion of said bar tightly in flatwise sliding engagement with the other of said members, whereby said bar provides dissipation of shock energy in sliding friction between said second portion and said other member and in heat generated by repeated oscillatory deformation of said bar beyond its elastic limit.

2. A shockmount for preventing damage from high impact shock comprising a supporting member subject to vibration under shock, a supported member, an elongated substantially bow shaped connecting bar rigidly secured at its center to one of said members and constituting normally a substantially rigid support for said supported member without substantial bending of said bar by the weight of said supported member, said bar being formed of a material incapable of withstanding said high impact shock without exceeding its elastic limit, and means securing the ends of said bar to the other of same members, said means including clamping means securing at least one end of said bar tightly in flatwise sliding engagement with said other member, whereby said bar provides dissipation of shock energy in sliding friction between said one end and said other member and in heat generated by repeated oscillatory deformation of said bar beyond its elastic limit.

3. A shockmount for preventing damage from high impact shock comprising a supporting member subject to vibration under shock, a supported member, an elongated substantially bow shaped connecting bar rigidly secured at its center to one of said members and normally constituting a substantially rigid support for said supported member without substantial bending of said bar by the weight of said supported member, said bar being formed of cold rolled steel having an elastic limit which is exceeded by said high impact shock, and clamping means securing the ends of said bar tightly to the other of said members, said clamping means providing for flatwise sliding movement between at least one of said ends and said other member, whereby said bar provides dissipation of shock energy in sliding friction between said bar and said other member and in heat generated by repeated oscillatory deformation of said bar beyond its elastic limit.

CARL E. BAZLEY.
CHARLES BANGERT, Jr.

REFERENCES CITED

The following references are of record in the file of this patent:

UNITED STATES PATENTS

| Number | Name | Date |
|---|---|---|
| 215,515 | Gage et al. | May 20, 1879 |
| 1,022,912 | Woodward | Apr. 9, 1912 |
| 1,235,703 | Larson | Aug. 7, 1917 |
| 1,248,728 | Scott | Dec. 4, 1917 |
| 2,107,329 | Gleason | Feb. 8, 1938 |
| 2,139,063 | Beach | Dec. 6, 1938 |
| 2,317,501 | Tyler | Apr. 27, 1943 |